United States Patent
Mergen

(10) Patent No.: US 8,311,508 B2
(45) Date of Patent: Nov. 13, 2012

(54) WIRELESS ENABLED DEVICE TRACKING SYSTEM AND METHOD

(75) Inventor: John-Francis Mergen, Baltimore, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1463 days.

(21) Appl. No.: 11/853,432

(22) Filed: Sep. 11, 2007

(65) Prior Publication Data
US 2009/0146831 A1    Jun. 11, 2009

(51) Int. Cl.
*H04M 11/04*    (2006.01)
(52) U.S. Cl. .................................................... 455/404.2
(58) Field of Classification Search ............. 340/825.49, 340/426.22, 7, 47, 8, 1, 9, 15; 446/225; 324/644, 324/635; 455/456.1; 342/357, 2
See application file for complete search history.

(56) References Cited

U.S. PATENT DOCUMENTS

| | | | | |
|---|---|---|---|---|
| 5,933,099 A * | 8/1999 | Mahon | ......................... | 340/961 |
| 5,984,240 A * | 11/1999 | Shinagawa | .................... | 244/195 |
| 6,362,782 B1 * | 3/2002 | Greenspan et al. | ........... | 342/453 |
| 6,782,320 B1 * | 8/2004 | Bahder | ........................ | 701/213 |
| 6,868,073 B1 * | 3/2005 | Carrender | ..................... | 370/278 |
| 7,119,738 B2 * | 10/2006 | Bridgelall et al. | ............. | 342/129 |
| 7,587,196 B2 * | 9/2009 | Hansen | ........................ | 455/406 |
| 2006/0181414 A1 * | 8/2006 | Bandy et al. | ............. | 340/539.22 |
| 2008/0161016 A1 * | 7/2008 | Hochwald et al. | ......... | 455/456.2 |

* cited by examiner

*Primary Examiner* — Vernal Brown

(57) ABSTRACT

Systems and methods are provided for determining a location of one or more wireless devices. The method may include identifying an address associated with at least one wireless device and determining a phase relationship between a plurality of signals generated by the wireless device. The method further includes determining a location of the wireless device based on the phase relationship and the address associated with the wireless device.

25 Claims, 6 Drawing Sheets

WIRELESS ENABLED DEVICE TRACKING SYSTEM AND METHOD

BACKGROUND

Various techniques have been developed for identifying a target. For example, radiofrequency systems, global positioning systems, Lorenz beams, and radar targeting missiles have been used to identify the location of a target.

The use of body area networks (BANs) have been developed to support the connection of multiple devices carried by an individual. BANs are used to support the interconnection of telephones, headsets, GPS devices, PCs, MP3 players, and the like. One form of a BAN is Bluetooth wireless technology, which is a communications system configured to facilitate communication between wireless devices. One characteristic of BANs is that there are at least two emitters that share a form of addressing so that the emitters may be identified to each other. The address of a device that is operating a BAN includes a data string that is transmitted between the wireless devices to permit the acceptance by the devices within the BAN. This unique addressing scheme is used to support the security of devices that employ Bluetooth or similar technology.

Despite the improvements made to conventional techniques for locating a target, there is a need for a method and system for targeting wireless devices, such as one or more wireless devices within a BAN. In particular, there is a need for a method and system for identifying a wireless device using an address associated with the wireless device and determining a location of the wireless device based on one or more signals generated by the wireless device.

DETAILED DESCRIPTION

Figure 1:
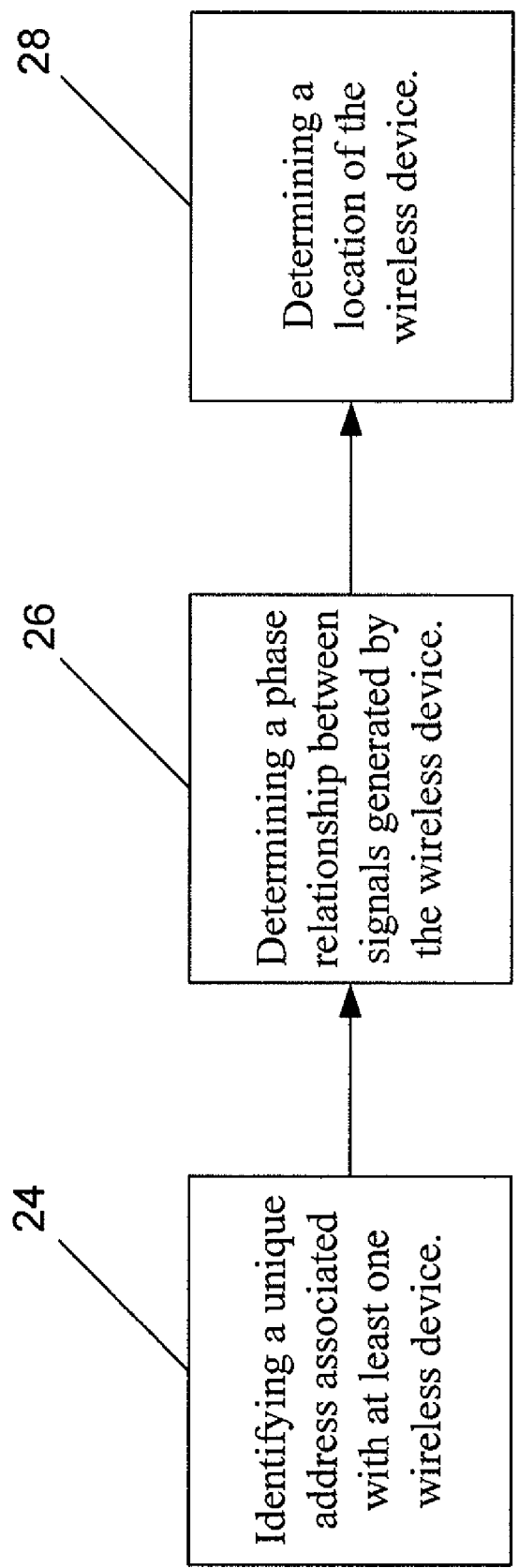
FIG. 1 illustrates a method for locating a target according to one embodiment.

Exemplary embodiments are described hereinafter with reference to the accompanying drawings, in which exemplary embodiments and examples are shown. Like numbers refer to like elements throughout.

Embodiments are directed to a system 10 configured to target one or more wireless devices 12. In particular, the system 10 is capable of identifying and locating a wireless device 12 using an address associated with the wireless device and a phase of one or more signals 18 generated by the wireless device and received at an aerial device 16. Thus, the unique address and phase may be used to locate the wireless device 12 and direct the aerial vehicle 16 towards the location of the wireless device based on the phase of the one or more signals 18.

According to one embodiment the system 10 comprises an aerial vehicle 16, such as a glider, an airplane, a lighter than air aircraft, a rotocraft, a vectored thrust aircraft, or the like. For example, the aerial vehicle 16 could be an unmanned aerial vehicle (UAV) or an autonomous aerial device (AAD). The aerial vehicle 16 could be any vehicle configured to transmit and receive signals, such as via a transceiver and one or more antennas carried by or otherwise associated with the aerial vehicle. In particular, the aerial vehicle 16 is configured to receive one or more signals generated by the wireless device 12. In addition, the aerial vehicle 16 is capable of achieving an airborne position and performing embodiments of methods described herein to locate a target while in the airborne position and repositioning a direction of flight if necessary to guide towards a target. Thus, embodiments of the system and method may allow an aerial vehicle 16 to acquire the location of a wireless device 12 and track the location of the wireless device, or to terminate the wireless device, such as with an air-to-ground missile, rocket, or the like, without knowing the location of the wireless device prior to launch and without requiring a line of sight to the target. It is also understood that the aerial device 16 may include a payload that is used to terminate the wireless device 12. Furthermore, if employed as an UAV or AAD, the aerial vehicle 16 may include various features as are well known, such as various command, control, and data acquisition capabilities and may be remotely controlled by an operator. The aerial vehicle 16 may further include visual capabilities as are well known, such as a video camera, that may communicate images to a control station. The aerial vehicle 16 may travel at any desired altitude and speed, and according to one embodiment, the aerial vehicle may be traveling at more than 120 k/h.

In the various embodiments, the term "wireless device" is referenced. A wireless device may be any of a number of devices or components designed to communicate via a wireless communications network. For example, a wireless device may be a handheld electronic device, cellular phone, PDA, transmitter, server, network-to-network interface, short-range wireless device, desktop computer, laptop computer, or any other processing device, whether fixed or mobile, that facilitates wireless communication. Furthermore, each wireless device may be configured to send and receive one or more signals via wireless communication. The wireless devices typically communicate using a communications controller to communicate with external communication networks. The wireless devices may be configured to communicate with other wireless devices and an aerial vehicle via wireless external communication networks using a wireless protocol such as Bluetooth, 802.11 (i.e., Wi-Fi), 802.16 (i.e., Wi-Max), 2 G networks such as Global System for Mobile communications (GSM) and Code Division Multiple Access (CDMA), 2.5 G networks such as Enhanced Data GSM Environment (EDGE), or any other addressable wireless protocol.

FIG. 1 shows an exemplary method for targeting one or more wireless devices 12 according to one embodiment. The method generally includes identifying a unique address associated with at least one wireless device 12 (block 24) and determining a phase relationship between a plurality of signals 18a, 18b generated by the wireless device(s) (block 26). The method further includes determining a location of the wireless device(s) 12 based on the phase relationship and the unique address associated with the wireless device(s) (block 28).

Figure 2:
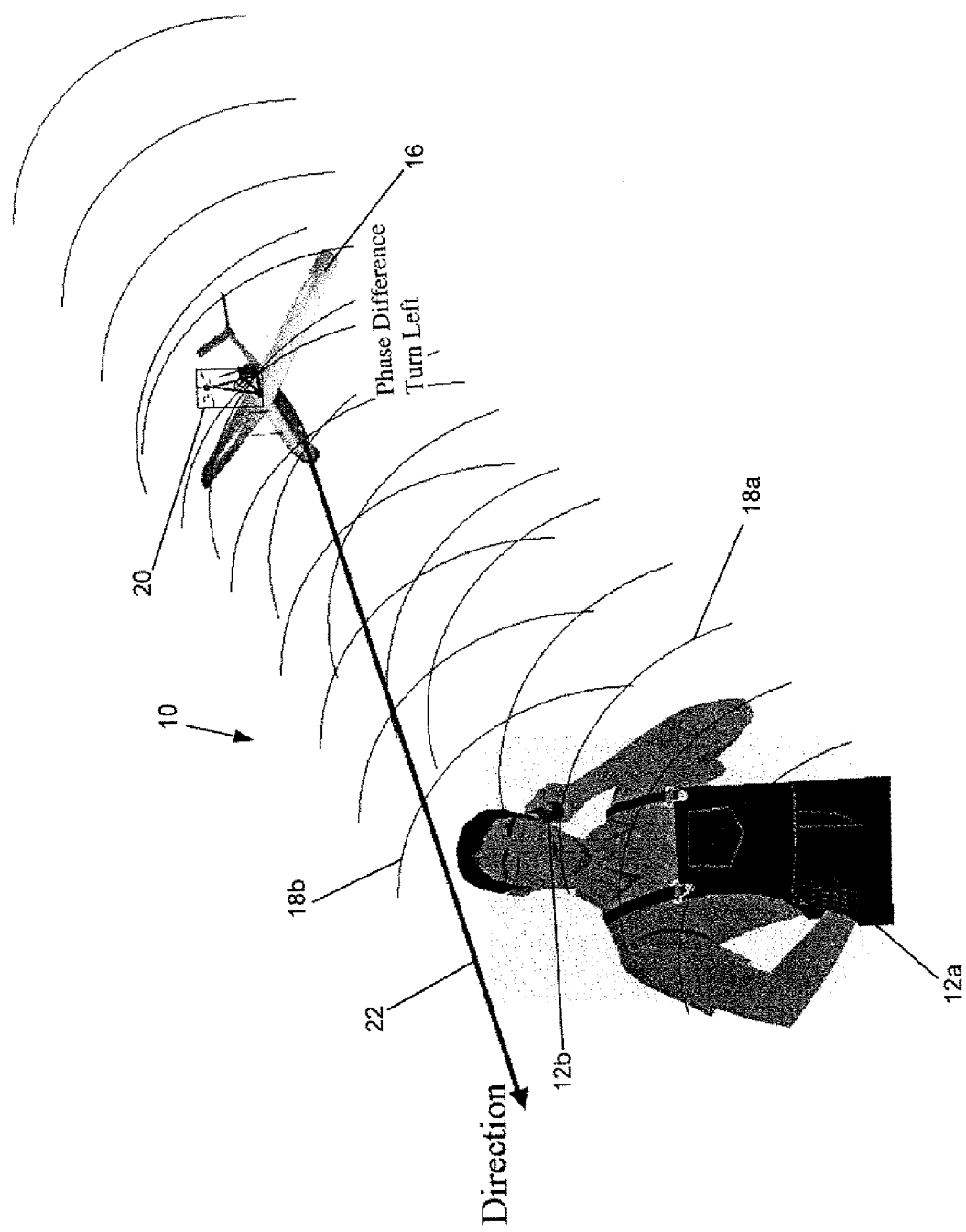
FIG. 2 shows a system for locating a target according to one embodiment.

FIG. 2 shows an exemplary system 10 for locating a wireless device 12 according to one embodiment. The system 10 of FIG. 2 may be configured to perform the steps set forth in the method of FIG. 1. There is shown in FIG. 2 a pair of wireless devices 12a, 12b that include respective emitters for generating signals 18a, 18b. For example, wireless device 12a could be a short-range cellular phone (e.g., Bluetooth phone), while wireless device 12b could be a short-range wireless device (e.g., Bluetooth headset). Each wireless device 12a, 12b includes a unique address or identifier that facilitates identification and communication between one another. The range of the signals 18a, 18b of the wireless devices 12a, 12b between one another may vary, and according to one embodiment, the range may be from 10 m to 100 m.

FIG. 2 also illustrates that an aerial vehicle 16 includes an antenna 20 for receiving the signals 18a, 18b. Although the antenna 20 could be located at different positions, the antenna of the illustrated embodiment is located at approximately the centerline of the fuselage. The aerial vehicle 16 is capable of identifying the unique addresses associated with each wireless device 12a, 12b. For instance, the aerial vehicle 16 may be capable of hovering in an area until the wireless devices 12a, 12b are activated, and the aerial vehicle may receive the signals 18a, 18b upon activation and, thus, detect when the wireless devices are activated. The aerial device 16 may then identify the unique addresses and determine if the unique addresses are of interest (e.g., an address associated with a predetermined target). Thus, each wireless device 12a, 12b provides a unique radio transmission signature that may enable the aerial vehicle 16 to differentiate the identified signals 18a, 18b from noise.

The aerial vehicle 16 in FIG. 2 is shown as traveling in a direction indicated by arrow 22. The aerial vehicle 16 is configured to receive the signals 18a, 18b at the antenna 20 and determine a phase relationship between the signals. In particular, the wireless devices 12a, 12b may generate signals 18a, 18b that may function as Lorenz beams such that the signals overlap one another and intersect at approximately their midpoints at the antenna 20. When the antenna 20 receives the signals 18a, 18b, a determination is made as to the phase difference between the signals 18a, 18b. Using the phase difference, the aerial vehicle 16 may correct its direction or heading, if necessary, towards the wireless devices 12a, 12b based on the phase difference.

For instance, FIG. 2 shows that the aerial vehicle 16 is traveling in a direction 22 that is out of line with the phase relationship between the signals 18a, 18b. Namely, the heading of the aerial vehicle 16 may be adjusted by a margin equal to the phase difference between the signals 18a, 18b in order to direct the aerial vehicle towards the wireless devices 12a, 12b. The heading may be adjusted a particular direction based on a phase relationship or signal strength received at the antenna 20. For example, the direction of the aerial vehicle 16 could be adjusted to achieve a predetermined phase relationship (e.g., in phase) or a maximum signal strength. In FIG. 2, for example, the aerial vehicle 16 is heading right of the wireless devices 12a, 12b and would need to turn left by a margin equal to approximately the phase difference of the signals 18a, 18b in order to more accurately head towards the wireless devices.

Figure 6:
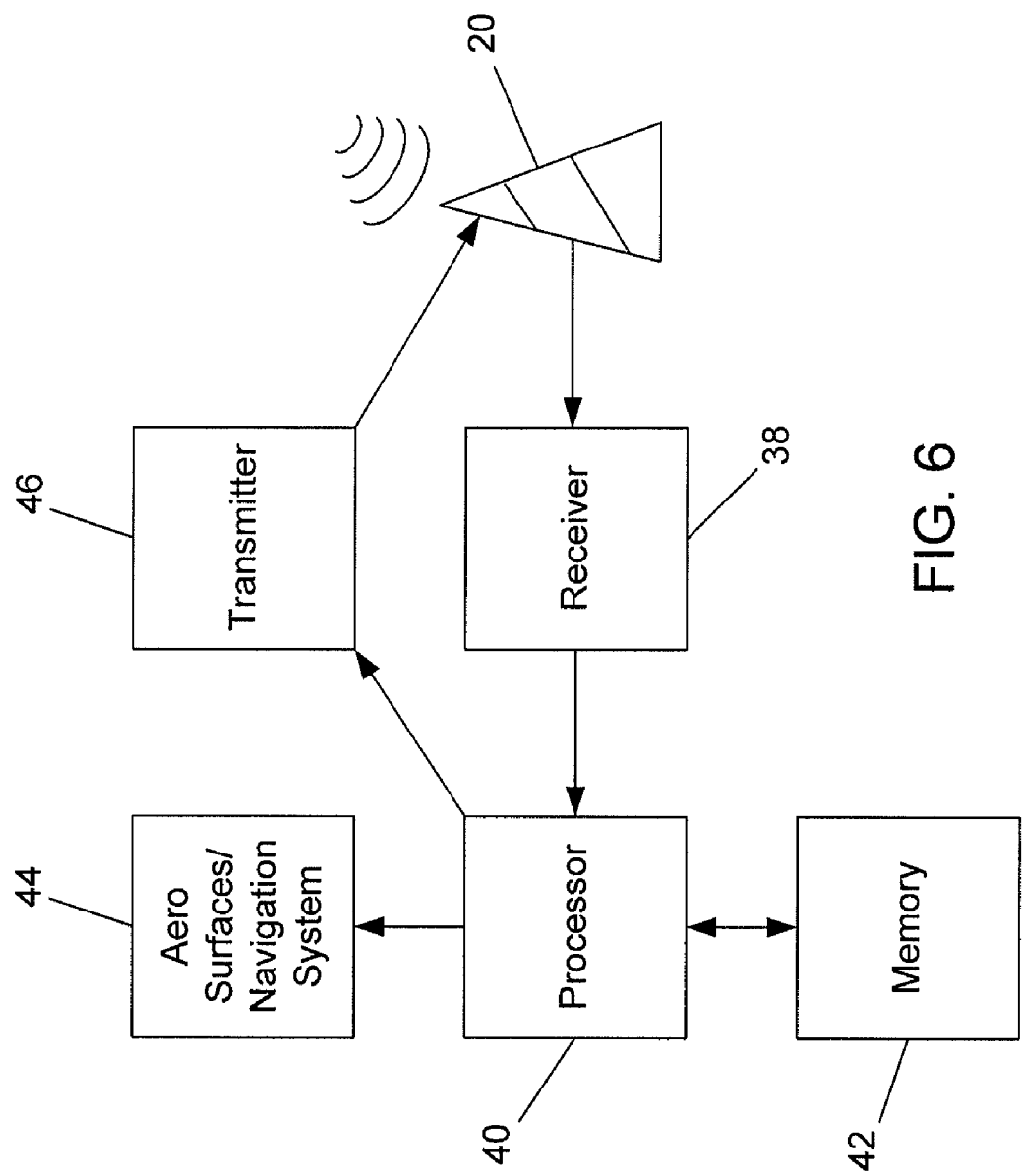
FIG. 6 depicts an aerial vehicle according to one embodiment.

As shown schematically in FIG. 6, the aerial vehicle 16 may include a receiver 38 coupled to the antenna 20 for receiving the signals. The aerial vehicle 16 of the illustrated embodiment may also include a processor 40, such as a microprocessor, integrated circuit or other computing device, for identifying a wireless device 12 based upon the received signals 18. In this regard, the aerial vehicle 16 can include a memory 42 for storing the unique addresses or identifiers of the wireless devices 12 such that the processor 40 can identify a wireless device by comparing the address or identifier included within the received signals 18 with the addresses and identifiers stored in memory. The processor 40 can also determine the phase difference between the signals 18 and, based upon the phase difference and the current direction of motion of the aerial vehicle 16 (such as provided by a navigation system or the like), provide commands to the navigation system and/or the aerodynamic surfaces 44 to cause the aerial vehicle to be redirected toward the wireless device 12. For example, the processor 40 may issue commands based upon the phase difference to cause one or more aerodynamic surfaces 44 to be repositioned in order to redirect the aerial vehicle 16 as desired. While the embodiment of FIG. 6 depicts the aerial vehicle 16 as including the various elements, at least some of the elements may be offboard, such as in a command station or the like. In this regard, the aerial vehicle 16 can include a transmitter 46 for forwarding the signals 18 received from the wireless devices 12 to an offboard location that includes the processor 40 and memory 42 for identifying the wireless device and determining the redirection, if any, of the aerial vehicle. The command station or other offboard location can then relay the appropriate navigational commands to the aerial vehicle 16 for effecting the desired redirection.

Figure 3:
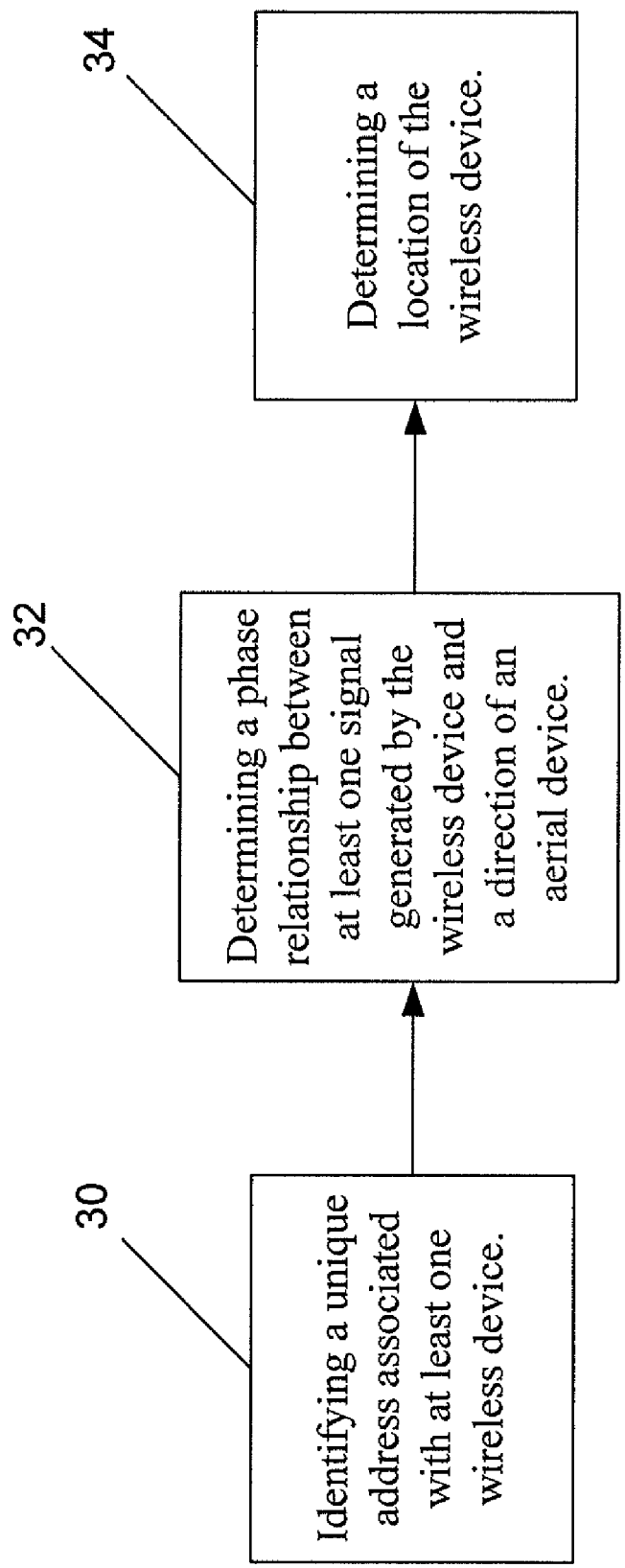
FIG. 3 illustrates a method for locating a target according to one embodiment.

FIG. 3 shows an exemplary method for targeting one or more wireless devices 12 according to one embodiment. The method includes identifying a unique address associated with at least one wireless device 12 (block 30) and determining a phase relationship between at least one signal 18 generated by the wireless device(s) and a direction of an aerial device 16 (block 32). For example, the phase relationship may be based on a phase difference between a plurality of signals 18a, 18b and the direction of the aerial device 16 as described above in conjunction with FIG. 2. Using the phase relationship and unique address, the location of the wireless device(s) may be determined (block 34).

Figure 4:
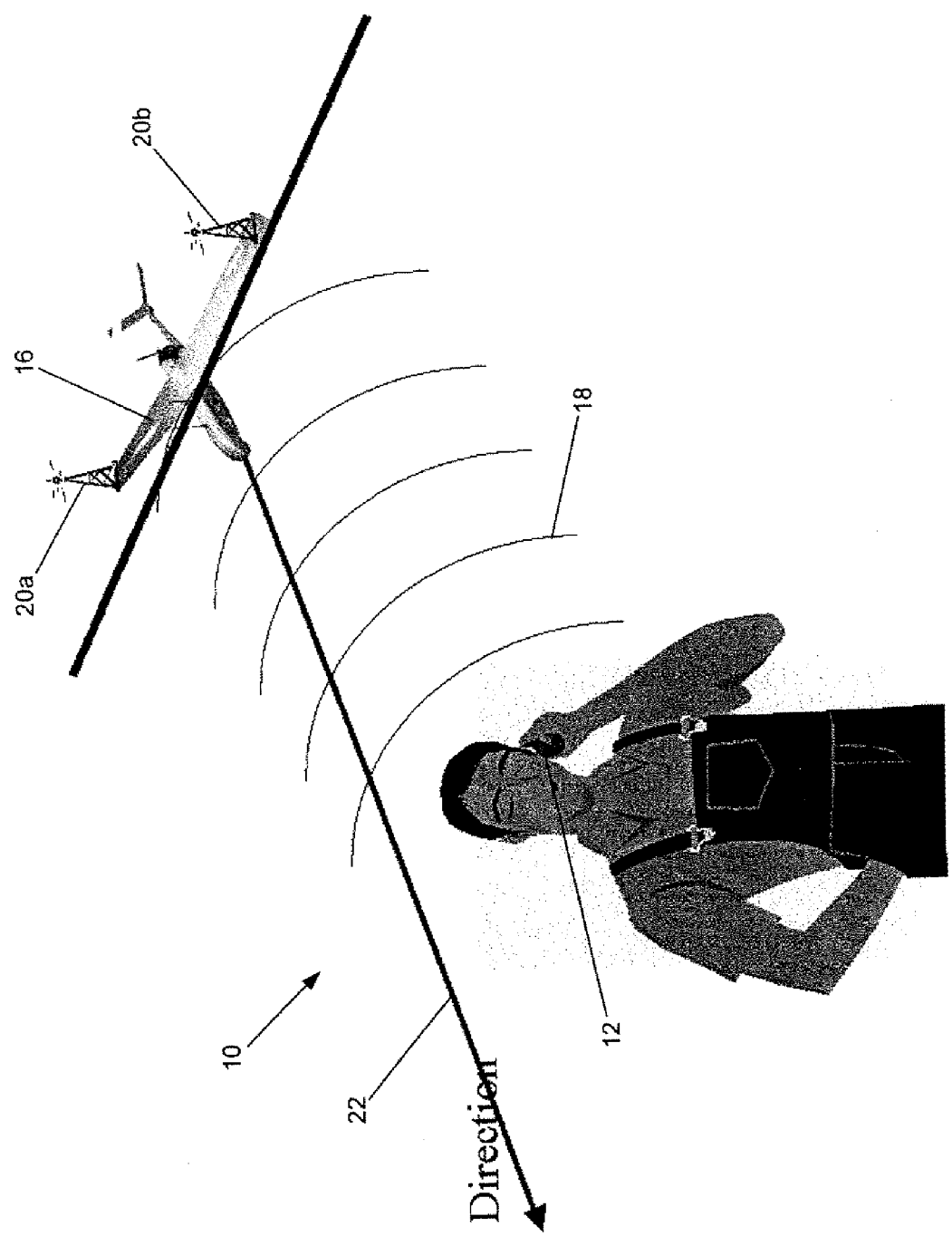
FIG. 4 shows a system for locating a target according to another embodiment.

FIG. 4 illustrates an additional embodiment of a system 10 for locating a wireless device 12 and which may also be capable of performing the method of FIG. 3. More specifically, FIG. 4 shows a wireless device 12 associated with a user that is capable of transmitting at least one signal 18 generated by one or more emitters associated with the wireless device(s) 12. As discussed above, the signal(s) is typically first filtered and selected based on a unique identifier associated with a respective signal in order to identify the wireless device(s) 12.

Moreover, FIG. 4 shows that the aerial vehicle 16 includes a receiver and a pair of antennas 20a, 20b. The antennas 20a, 20b are spaced apart from one another, and according to one embodiment, the antennas are located proximate to the longitudinal extremes of the aerial vehicle 16, such as proximate to the wingtips of the aerial vehicle. Upon receiving the signal(s) 18 transmitted by the wireless device(s) 12 at the antennas 20a, 20b, a difference in arrival time is measured, such as by the processor, in order to determine a phase relationship between the signal(s) and the direction of the aerial vehicle 16. Thus, the phase relationship between the signal(s) 18 and the current direction of the aerial vehicle 16 may be used by the processor to provide a correcting signal for redirecting the aerial vehicle towards the wireless device 12. The correcting signal is generated based on the aerial vehicle's 16 flight dynamics to move to an intercept course which minimizes the phase discrepancy across the impeded receiving antenna. The correcting signal may be used to redirect the aerial vehicle 16 towards the wireless device 12 such that there is no difference in arrival time of the signal(s) 18 at the antennas 20a, 20b.

In either embodiment shown in FIGS. 2 and 4, there is the possibility that the aerial vehicle 16 will be flying away from the wireless device(s) 12 rather than towards the wireless device because determining the phase relationship does not take into account the strength of the signal(s) 18. Therefore, a signal strength of the signal(s) 18 may be determined if the antenna(s) 20 fails to detect the signal(s) over time or in order to verify that the aerial vehicle 16 is directed towards the wireless device(s) 12. In this regard, the signal strength would increase over time if the aerial vehicle 16 flies towards the wireless device(s) 12 and decrease over time if the aerial device flies away from the wireless device(s).

Figure 5:
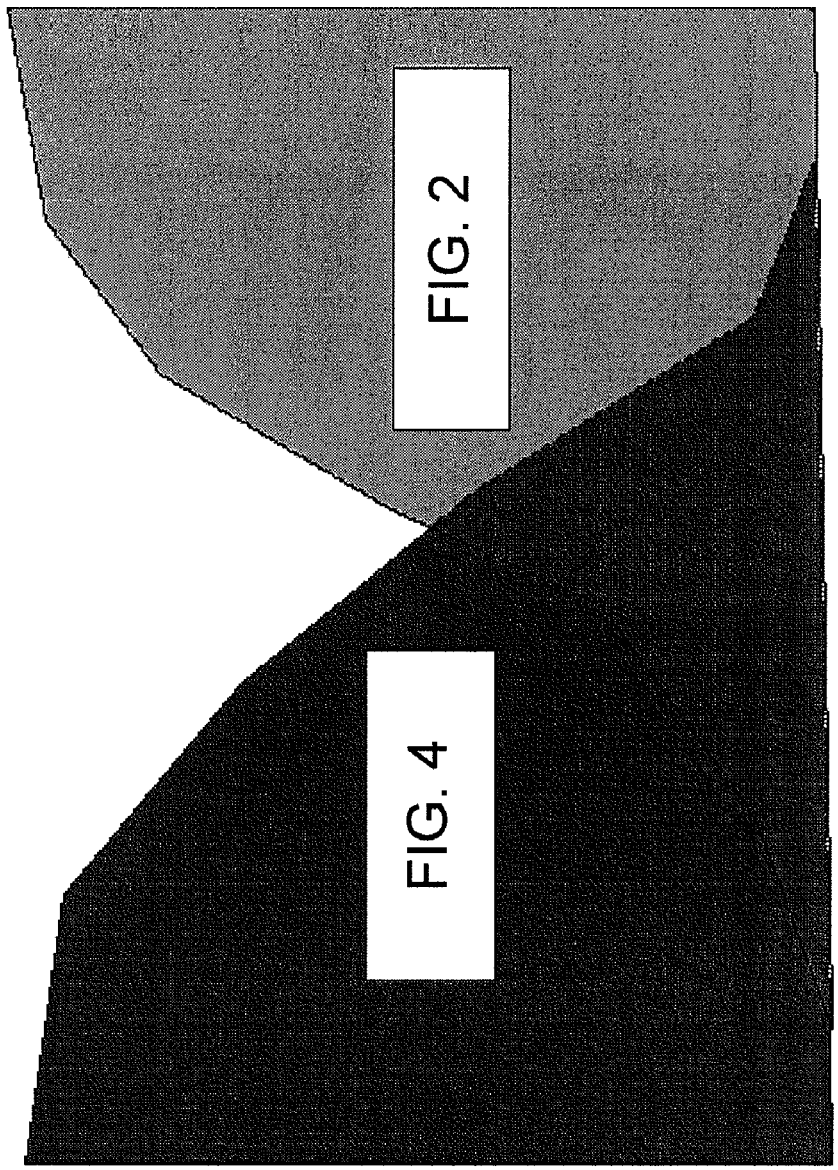
FIG. 5 illustrates a graph of a relationship between the timing and different techniques for locating a target according to one embodiment.

FIG. 5 illustrates that the systems 10 associated with FIGS. 2 and 4 may be used at different times between the launch and terminal phases of locating the wireless device(s) 12. In this regard, the embodiment illustrated in FIG. 4 may be used after the launch or initial phase of flight of the aerial vehicle 16. The embodiment shown in FIG. 4 may be sensitive to changes in heading of the aerial vehicle 16 such that the method of FIG. 4 may be used after launch and prior to the terminal phase of flight where less precision is required. Towards the terminal phase of flight (i.e., just prior to terminating the wireless device(s)), the aerial vehicle 16 may employ the embodiment of FIG. 2, where the method may be more susceptible to changes in direction of the wireless device(s) 12. Thus, the method of FIG. 2 may provide more precision as to the location of the wireless device(s) 12 to more accurately terminate the wireless device(s). Accordingly, embodiments of the system may allow for the interchangeability between the methods shown in FIGS. 2 and 4 depending on the precision desired while locating the wireless device(s) 12.

As indicated above, the aerial vehicle 16 may travel at various speeds and altitudes. The aerial vehicle 16 may travel at a speed that allows the processor 40 to provide a correction signal in such a way that the aerial vehicle is critically damped (e.g., having a Nyquist criteria of −1 or less). According to one embodiment, the aerial vehicle 16 may be configured to travel at about 120 kts and the total elapsed time for terminal guidance may be about 3 seconds or less, and the aerial vehicle may be within a range of about 100 m from the wireless device 12. In addition, the aerial vehicle 16 may be configured to identify the wireless device(s) 12 and employ a video camera to observe the target associated with the wireless device(s) at a standoff position. In particular, the aerial vehicle 16 may use a signal strength arc to monitor the target. The arc may be similar to the DME arc procedure as specified by the FAA in the FARS and in the normal approach plats used in civil aviation.

It is understood that the embodiments shown in FIGS. 2 and 4 are not meant to be limiting, as the system 10 may be various sizes and configurations in additional embodiments. For example, although a pair of wireless devices 12a, 12b are shown in FIG. 2, and a single wireless device 12 is shown in FIG. 4, there may be one or more wireless devices transmitting one or more respective signals 18. Moreover, each wireless device 12 may have one or more emitters for transmitting one or more signals 18 that may be received at the aerial vehicle 16. Furthermore, although the wireless devices 12 shown in FIGS. 2 and 4 are associated with a human, it is understood that the wireless device may be transmitted from any object associated with a wireless device, such as a building, vehicle, and the like. With respect to FIG. 2 where there are two wireless devices 12a, 12b associated with a human, it is understood that the wireless devices need not necessarily be in close proximity to one another but, rather, may be within a range (e.g., 10 m to 100 m) that facilitates communication between a plurality of wireless devices. In addition, there may one more antenna(s) 20 located at various positions on the aerial vehicle 16. For instance, although the antennas 20a, 20b are shown proximate to the wingtips of the aerial vehicle 16 in FIG. 4, it is understood that the antennas may be located proximate to the fuselage or any other position where the antennas are equidistant from the centerline of the fuselage.

As will be appreciated, the exemplary embodiments may be implemented as a method, a data processing system, apparatus, or a computer program product. Accordingly, the exemplary embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the exemplary embodiments may take the form of web-implemented computer software. Any suitable computer-readable storage medium may be utilized including hard disks, CD-ROMs, optical storage devices, or magnetic storage devices.

With reference to the exemplary embodiments of block diagrams and flowchart illustrations of methods, apparatuses, systems, and computer program products shown and described above, it should be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. For example, while particular files have been referenced, the information, instead, may be obtained from other sources. The specification and drawings are accordingly to be regarded in an illustrative rather than a restrictive sense.

What is claimed:

1. A method comprising:
   identifying addresses associated with a plurality of wireless devices;
   determining a phase relationship between signals generated by each wireless device of the plurality of one wireless devices; and
   determining a location of at least one wireless device of the plurality of wireless devices based on the phase relationship, the addresses associated with the plurality of one wireless devices, and a direction of an aerial vehicle.

2. The method of claim 1, where identifying comprises identifying a pair of signatures provided by a short-range wireless device and a cellular device.

3. The method of claim 1, further comprising selecting the signals based on the addresses associated with the plurality of wireless devices.

4. The method of claim 1, further comprising receiving the plurality of signals at one or more antennas associated with the aerial vehicle.

5. The method of claim 4, where determining the phase relationship comprises determining a phase difference between a pair of the signals at a single antenna.

6. The method of claim 5, further comprising providing a correcting signal for directing the aerial vehicle to the location of the at least one wireless device of the plurality of one wireless devices based on the phase difference between the pair of signals.

7. A system implemented on an aerial vehicle, the system comprising:
   a processor to determine a location of a plurality of wireless devices based on an address associated with each wireless device of the plurality of wireless devices and a phase relationship between signals generated by each wireless device of the plurality of wireless devices and a direction of the aerial vehicle.

8. The system of claim 7, where the processor comprises an autonomous aerial device.

9. The system of claim 7, further comprising at least one short-range wireless device.

10. The system of claim 7, where the processor is to identify a pair of signatures provided by a short-range wireless device and a cellular device.

11. The system of claim 7, further comprising at least one antenna to receive the plurality of signals.

12. The system of claim 11, further comprising a pair of antennas located at opposing ends of the aerial vehicle.

13. The system of claim 12, where the processor is to determine a difference in an arrival time of the signals at the pair of antennas.

14. The system of claim 13, where the processor is to provide a correcting signal for directing the aerial vehicle to the location of the plurality of wireless devices based on the difference in arrival time.

15. The system of claim 11, where the processor is to determine a phase difference between the signals at a single antenna.

16. The system of claim 15, where the processor is to provide a correcting signal for directing the aerial vehicle to the location of the plurality of wireless devices based on the phase difference between the signals.

17. A method comprising:
    identifying addresses associated with more than one wireless device; and
    determining a location of the more than one wireless device based on the addresses and a phase relationship between a plurality of signals, each signal generated by a different wireless device of the more than one wireless device, and a direction of an aerial vehicle.

18. The method of claim 17, where identifying comprises identifying a pair of addresses provided by a short-range wireless device and a cellular device.

19. The method of claim 17, further comprising selecting the plurality of signals based on the addresses associated with the more than at least one wireless device.

20. The method of claim 17, further comprising receiving the plurality of signals at one or more antennas associated with the aerial vehicle.

21. The method of claim 20, where determining comprises determining a difference in an arrival time of the plurality of signals at a pair of antennas.

22. The method of claim 21, further comprising providing a correcting signal for directing the aerial vehicle to at least one wireless device of the more than one wireless device based on the difference in arrival time.

23. The method of claim 17, further comprising measuring a signal strength of at least one signal of the plurality of signals.

24. The method of claim 17, where determining comprises determining a phase difference between a pair of signals.

25. The method of claim 24, further comprising providing a correcting signal for directing an aerial vehicle to the location of at least one wireless device of the more than one wireless device based on the phase difference.

* * * * *